Oct. 11, 1949.  A. L. LEE  2,484,715
BRAKE MECHANISM FOR RAIL CARS
Original Filed July 21, 1945  3 Sheets-Sheet 1

Inventor;
ARTHUR L. LEE,

By
Attorney.

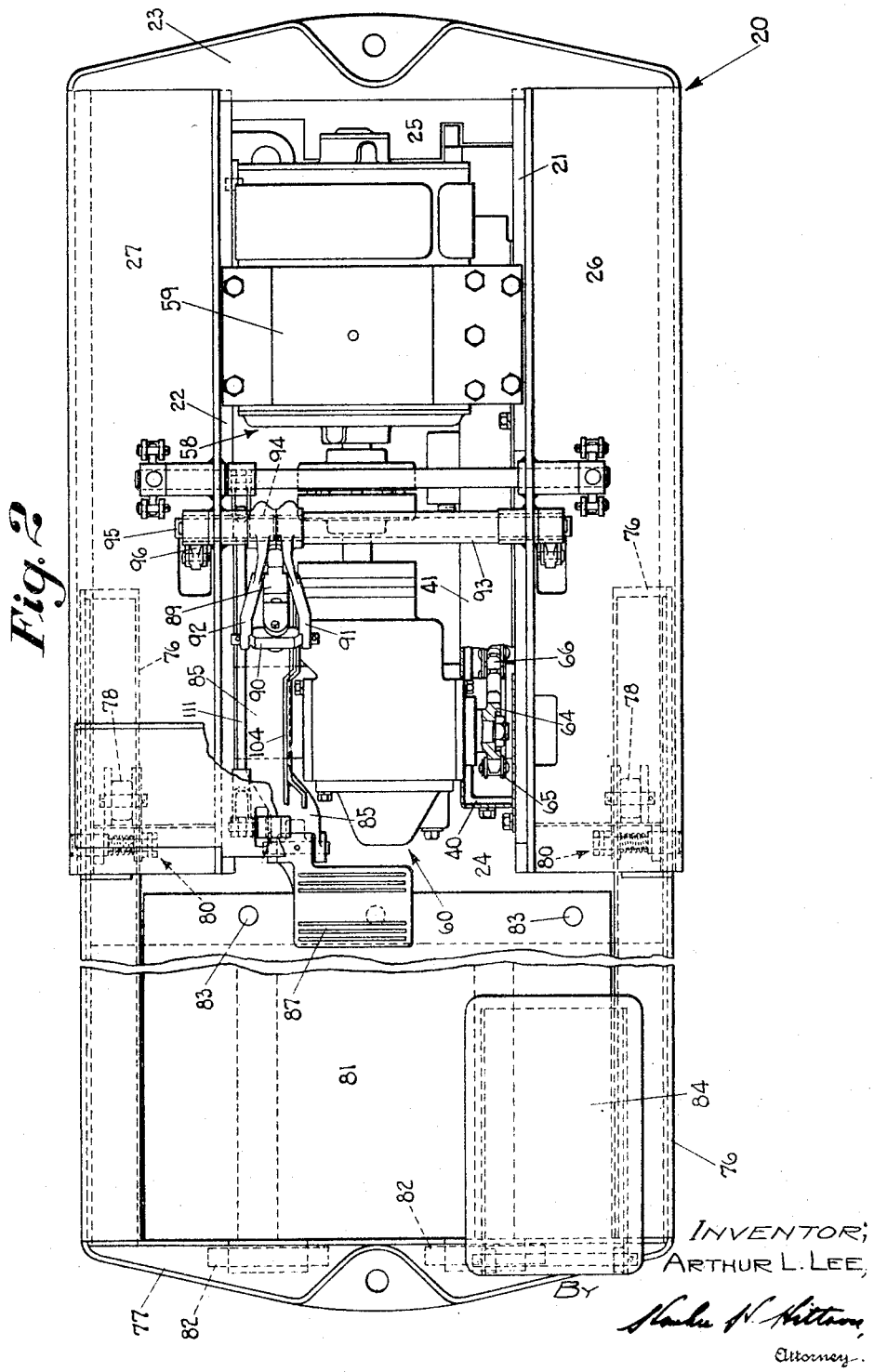

Oct. 11, 1949.  A. L. LEE  2,484,715
BRAKE MECHANISM FOR RAIL CARS
Original Filed July 21, 1945  3 Sheets-Sheet 3
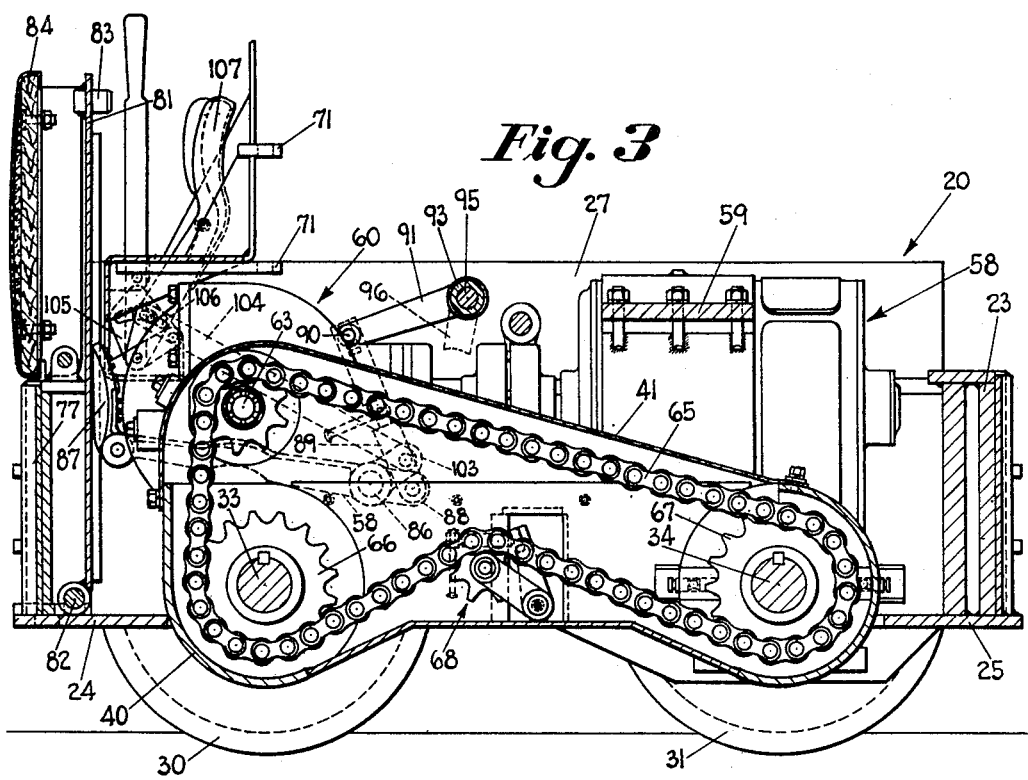
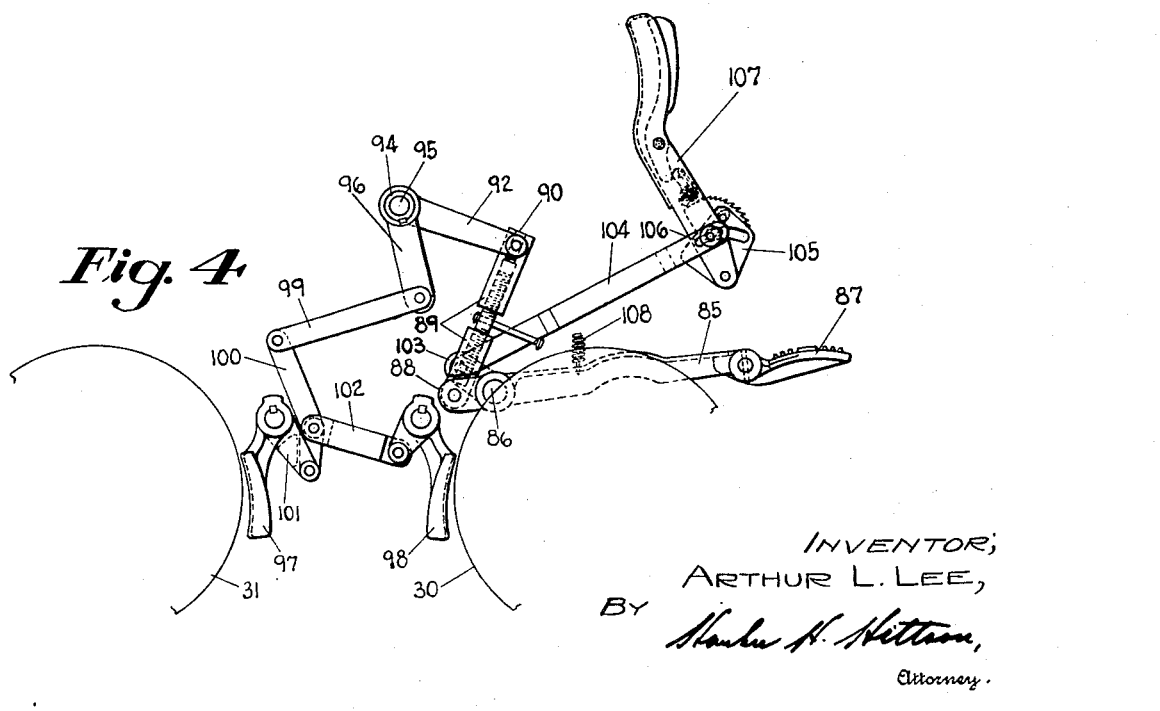
INVENTOR,
ARTHUR L. LEE,
BY
Attorney.

Patented Oct. 11, 1949

2,484,715

UNITED STATES PATENT OFFICE 2,484,715

BRAKE MECHANISM FOR RAIL CARS

Arthur L. Lee, Upper Arlington, Ohio, assignor to The Jeffrey Manufacturing Company, a corporation of Ohio Original application July 21, 1945, Serial No. 606,327. Divided and this application May 17, 1948, Serial No. 27,551

2 Claims. (Cl. 188—52)

This invention relates to brake mechanisms for rail vehicles and more particularly to brake mechanism for a tramming locomotive.

One object of the invention is to provide a locomotive with brake control means which may be moved or folded to an out of the way position when an operator's platform portion of the main frame of the locomotive is telescoped or adjusted inwardly to reduce the overall length of the locomotive to a minimum.

Another object of the invention is to provide a locomotive with improved brake operating mechanism.

A further object of the invention is to provide an improved brake mechanism in a rail vehicle wherein the motion or force of a manually operated brake lever is divided through interconnected torsion means to brake shoes upon each side of the vehicle.

Other objects of my invention will appear hereinafter the novel features and combinations being set forth in the appended claims.

In the accompanying drawings,

Fig. 2 is a plan view of the locomotive seen in Fig. 1 with parts omitted;

Fig. 3 is a sectional elevational view through the locomotive with its battery box and other parts omitted and showing a portion of the brake operating mechanism of the locomotive, parts of the locomotive being shown in the positions which they occupy when the locomotive is telescoped;

Fig. 4 is a detailed view of a portion of the brake operating mechanism of the locomotive with many parts omitted in the interest of clearness.

This application is a division of my co-pending application, Ser. No. 606,327, filed July 21, 1945, for a Tramming locomotive. It is to be understood that the construction and operation of the locomotive of this application follows that of my parent application, above identified, and that only the subject matter pertinent to the present invention is discussed in detail herein.

Figure 1:
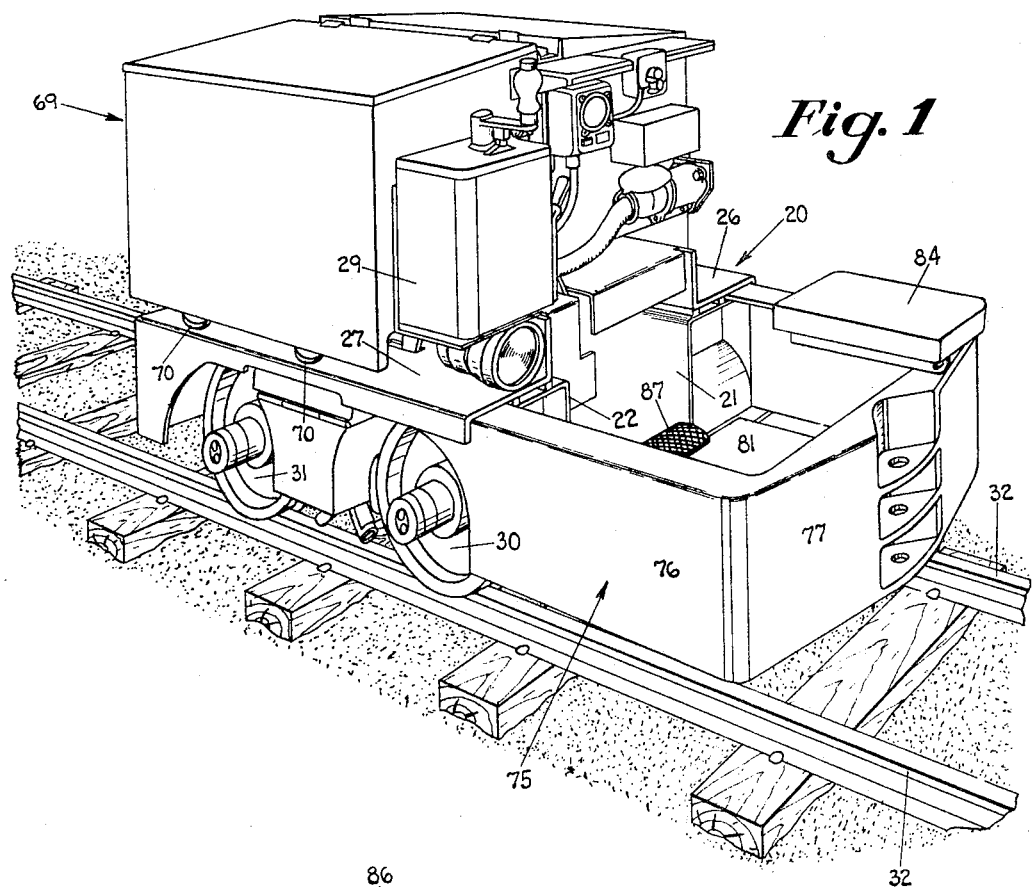
Fig. 1 is a perspective view of a telescoping tramming locomotive incorporating the features of my invention.

The telescoping locomotive includes a main frame 20 one member of which is supported by wheels and is formed of a pair of laterally spaced longitudinally extending right angle main frame side members 21 and 22 (see Fig. 1). At the rear ends of the said members 21 and 22 are rigidly connected together by a heavy crosspiece 23 (see Figs. 2 and 3) which forms a rear bumper and coupling member of the locomotive. At their bottoms and adjacent their forward and rearward ends the side members 21 and 22 are also connected by cross-plates 24 and 25, respectively.

Positioned above and rigidly attached to the horizontal plate portions of the main frame side members 21 and 22 are Z-shaped main frame aprons 26 and 27, the former being attached to main frame member 21 and the latter to main frame member 22. All of the main frame members above described are rigidly attached thereto as by welding and constitute principal elements of the wheel supported member of the locomotive main frame.

Adjacent the front or operator's end of the machine and at the top thereof is a transversely extending Z-shaped apron or plate which forms a support or dash board upon which a controller 29 and other instruments and adjuncts are supported.

The wheel supported member of the main frame 20 of the vehicle above described constitutes a truck frame and it is supported upon four flanged traction wheels, the front pair of which are designated 30 and the rear pair of which are designated 31. Flange wheels 30 and 31 are adapted to run along the rails 32 of the mine track, as clearly illustrated in Fig. 1 of the drawings. The front wheels 30 are mounted and keyed to a common shaft or front axle 33 and the rear wheels 31 are similarly mounted and keyed to a rear axle or shaft 34. Axle shafts 33 and 34 are mounted through bearings to the side members 21 and 22 of the truck frame.

The two shafts 33 and 34 are driven from an electric motor 58 which may, for example, be a direct current motor which is under the control of controller 29. Motor 58 is connected to and supported by a cross-piece 59 forming part of the truck main frame and rigidly attached at opposite ends to the frame members 21 and 22. The armature shaft of motor 58 drives a transmission 60 having a shaft 63 projecting from one side thereof into a housing, which as seen in Fig. 2 of the drawings, is formed by a casing 40 that extends longitudinally along one side of the truck frame member of the main frame 20 and adjacent the main frame side member 21 and the apron 26 which is provided with a removable cover plate 41 (see Fig. 3) so that the portion of the drive gearing between transmission shaft 63 and the axles 33 and 34 are housed and operated in a bath of lubricating oil. Shaft 63 is provided with a drive sprocket 64 which drives a single endless roller chain 65 which meshes with and drives a pair of drive sprockets 66 and 67 keyed to the axle shafts 33 and 34, respectively. A slack take-up mechanism 68 is provided in association with the lower run of the endless chain 65.

The locomotive illustrated is of the battery type and thus energy for operating the motor 58 is supplied by storage batteries. The storage batteries are mounted in a box 69 (see Fig. 1) which is preferably provided with four rollers 70 at the bottom thereof which provide for rolling the battery box 69 on and off the horizontal portions of aprons 26 and 27. The battery box 69 is removably held on the main frame by locking mechanism 71 (see Fig. 3).

Adjacent its forward end the telescoping main frame 20 of the locomotive includes an extensible member or operator's platform 75 which telescopes with the wheel supported or truck member of the main frame and which may be moved or telescoped longitudinally thereof in drawer-like fashion to reduce the overall length of the locomotive when it is to be elevated or lowered by a mine hoist or elevator. The telescoped position of the main frame 20 of the locomotive is illustrated in Fig. 3 of the drawings. In normal operation this platform is extended, as illustrated in Figs. 1 and 2 of the drawings. The platform 75 includes a generally U-shaped frame member 76, the front cross member 77 of which forms a front bumper or coupling device, the U-shaped frame member 76 being formed of integral upright and top bent over steel members. The bent over or horizontal flanges or wings of the U-shaped frame 76 extend rearwardly between the horizontal portions of the aprons 26 and 27 and the horizontal portions of the frame members 21 and 22, as clearly indicated in Fig. 1 of the drawings.

When the platform 75 is in its extended or outwardly telescoped position, as illustrated in Figs. 1 and 2 of the drawings, the upper horizontal portion of the U-shaped frame 76 overlaps the plates 21 and 22 approximately one-third of their length, as illustrated in Fig. 2 of the drawings. Anti-friction rollers 78 are provided adjacent the front portions of the frame members 21 and 22 and extend through apertures to support the rearwardly extending horizontal portions of the frame 76. Spring pressed locking mechanisms 80 are provided which releasably lock the platform 75 in its extended position. The platform 75 also includes a pivoted bottom plate 81 which is pivotally attached to the frame 76 at its front by a pivotal connection 82 so that the bottom plate 81 can swing upwardly about a horizontal axis at the front of the frame 76, thus providing for inward telescoping movement of platform 75 to the position shown in Fig. 3 of the drawings.

The bottom plate 81 is preferably provided at its rear end with a plurality of projecting lugs 83 adapted to be received in co-operating holes in the cross-plate 24 when the platform is extended. Thus the bottom plate 81 also acts to lock the platform 75 in its extended or outwardly telescoped position when said bottom plate 81 is down forming a floor or bottom of the operator's platform 75.

Pivotally mounted on one front corner of the platform 75 is an operator's seat 84 which is pivotally mounted on the cross-member 77 so as to swing upwardly about a horizontal axis when the platform 75 is pushed inwardly.

Manually operable brakes are provided for the locomotive which involve both a foot pedal operating mechanism and an emergency hand operating mechanism. The brake mechanism is such that a single adjustment provides for adjustment of all four brake shoes and this adjustment is effective both for the foot and hand operating devices.

Figure 5:
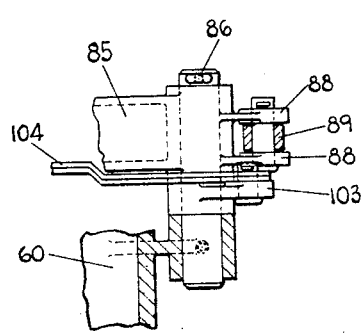
Fig. 5 is a combined sectional and plan view of details of the brake mechanism.

Referring particularly to Figs. 3, 4 and 5 of the drawings it will be seen that the brake mechanism includes a pivoted or jointed brake lever 85 which is pivotally mounted on a pin 86 carried by the truck frame member through the housing of transmission 60. Lever 85 is disposed adjacent the inside of side wall 22 of the main frame 20. At its forward end the lever 85 includes a foot lever, pedal or pad 87 which is pivoted to the main brake lever 85 on a horizontal axis which provides for its being swung upwardly to an out of the way position, as clearly illustrated in Fig. 3 of the drawings, to permit the maximum amount of inward movement of the platform 75. When the platform 75 is extended the foot lever or pad 87 extends above the floor or bottom plate 81 thereof so as to be accessible to the foot of the operator of the locomotive. It will be seen that the foot lever, pedal or pad 87 normally extends into an area occupied by the operator's portion or member 75 when the main frame 20 is telescoped inwardly but that it is pivoted so as to be swingable out of that area to an out of the way position when the member 75 is telescoped inwardly into the truck frame member.

As best seen in Fig. 5 of the drawings, the main or foot brake lever 85 is provided with a pair of short arms 88 which pivotally receive a linking means in the form of a turnbuckle or rod 89, the upper end of which is pivotally connected to and forms a part of an equalizing cross-head 90 (Figs. 2 and 4). The opposite ends of cross-head 90 are pivotally connected to arms 91 and 92 keyed to and extending in the same direction from torsion tubes or members 93 and 94, respectively, which are loosely mounted on a shaft 95 which extends transversely across the main frame 20.

The torsion tubes 93 and 94 are of reduced diameter where they extend through collars welded to the upstanding portions of aprons 26 and 27, as clearly illustrated in Fig. 2 of the drawings. Each of said tubes 93 and 94 has a downwardly extending arm keyed to its outer end, that is, the end thereof opposite the equalizer arm thereon associated with cross-head 90. The arm carried by tube 94 is designated 96.

In Fig. 4 there is illustrated in detail the linkage mechanism which extends from the arm 96 to a pair of brake shoes 97 and 98 pivoted to the truck frame and associated with or adapted to swing against the wheels 30 and 31 on one side of the vehicle. A duplicate arrangement is provided for operating similar brake shoes associated with wheels 30 and 31 on the opposite side of the truck which are actuated by an arm similar to arm 96 provided on the free or outer end of torsion tube or member 93.

The arm 96 is pivotally connected to a link 99 which in turn is pivotally connected to a lever 100, the bottom of which is pivotally attached to the crank arm 101 of brake shoe 97 which is pivotally attached for swinging movement on a fixed axis relative to the truck frame. A toggle link 102 is pivotally connected to an integral arm of the brake shoe 98 and to a point intermediate the ends of the lever 100. It will be seen that members 99, 100 and 102 constitute a linkage which when operated by arm 96 will apply or release the brakes.

In addition to the foot operated lever 85, a hand operated emergency or parking brake mechanism is provided for actuating the brakes which includes a short integral arm 103 (see Fig. 5) formed on brake lever 85. Arm 103 has the same effective length as the arms 88. An actuating rod 104 is pivotally connected to the arm 103 and extends forwardly, providing a pivotal connection with a pivoted plate 105 through a lost motion connector means including an elongated slot 106.

Plate 105 is carried on a pivoted brake lever 107 which is provided with the conventional actuating and locking detent mechanism. The lost motion slot 106 provides for free operation of the foot brake lever 85 without requiring operation of the emergency brake lever 107. It is, of course, evident that manual actuation of hand brake lever 107 will actuate lever 85 to operate the brakes. A spring 108 is provided to keep the brakes normally in free condition to permit free movement of the vehicle.

Upon the actuation of either of the foot or hand brake levers 85 or 107 the short arms 88 of foot lever 85 are swung upwardly and this upward motion of arms 88 is divided between the torsion tubes or members 93 and 94 by the equalizing mechanism interconnecting them including the arms 91, 92 and the cross-head member 90 including the turnbuckle 89. This equalized motion will then be transmitted to the pairs of brake shoes 97 and 98 upon each side of the locomotive whereby the brake shoes 97 acting upon wheels 31 will move or act thereagainst with substantially equal pressure and the brake shoes 98 acting upon wheels 30 will move or act thereagainst with substantially equal pressure.

The action of each pair of brake shoes on one side of the vehicle will be obvious from a consideration of the action which takes place when arm 96 swings counter-clockwise in response to brake actuation, as viewed in Fig. 4 of the drawings. This counter-clockwise movement will move the link 99 to the right which will swing the lever 100 about its bottom pivot and thus increase the distance between the pivot points on the arms of brake shoes 97 and 98. This will swing the brake shoes 97 and 98 about their fixed pivotal axes, thus applying the brakes.

It is to be particularly noted that by virtue of the single adjustment provided by the turnbuckle 89 it is possible to take up the slack in the complete braking system for all four brake shoes and for both the foot and hand brake levers.

From the foregoing description of my brake operating mechanism for rail vehicles it will be apparent that I have provided an improved brake operating mechanism wherein the motion or force of a manually operated lever is divided through an equalizing mechanism and torsion tubes or members to the brake shoes upon opposite sides of the rail vehicle whereby the brakes upon one side of the vehicle will be applied with force substantially equal to the force of the brakes upon the other side of the vehicle. It will also be apparent that I have provided in my improved brake mechanism a pair of manually operable levers, one of which actuates the other and one of which is operable independently of the other and which may be folded to permit shortening of the vehicle.

Obviously those skilled in the art may make various changes in the details and arrangement of parts without departing from the spirit and scope of the invention as defined by the claims hereto appended and I wish therefore not to be restricted to the precise construction herein disclosed.

Having thus described and shown an embodiment of my invention, what I desire to secure by Letters Patent of the United States is:

1. A locomotive having a main frame, a pair of front wheels and a pair of rear wheels supporting said main frame, and brake mechanism for said wheels, said brake mechanism including a foot operated lever pivoted to said main frame, a shaft extending transversely of said main frame, a pair of torsion tubes carried upon said shaft, equalizing means interconnecting adjacent ends of said torsion tubes including arms extending therefrom and cross-head means interconnecting said arms, a turnbuckle link connecting said cross-head means and said foot operated lever, a brake shoe for each of said wheels, said brake shoes for the wheels on each side of said main frame being operated in pairs by similar linkage mechanisms from said torsion tubes and each brake shoe being pivotally mounted to said main frame to swing against one of said wheels, each of said linkage mechanisms including an arm rigidly carried upon the end of one of said torsion tubes opposite the equalizer arm thereon, a lever pivoted to one of said brake shoes, a link pivoted to said lever adjacent said one end thereof and pivoted at its opposite end to said other brake shoe, and a link pivotally connected to the other end of said lever connecting said arm on said torsion tube whereby when said foot operated lever is moved to apply the brakes braking force is divided between said torsion tubes by said equalizing means and all of said brake shoes are swung against their respective wheels with substantially equal force, a hand operated lever for applying said brakes, said lever being pivoted to said main frame, and a linkage means including a lost motion connector means connecting said hand and foot operated levers for operating the latter, said lost motion connector means permitting operation of said foot operated lever independently of said hand operated lever.

2. A locomotive having a main frame, a pair of front wheels and a pair of rear wheels supporting said main frame, and brake mechanism for said wheels, said brake mechanism including a foot operated lever pivoted to said main frame, a shaft extending transversely of said main frame, a pair of torsion tubes carried upon said shaft, equalizing means interconnecting adjacent ends of said torsion tubes including arms extending therefrom and cross-head means interconnecting said arms, a turnbuckle link connecting said cross-head means and said foot operated lever, a brake shoe for each of said wheels, said brake shoes for the wheels on each side of said main frame being operated in pairs by similar linkage mechanisms from said torsion tubes and each brake shoe being pivotally mounted to said main frame to swing against one of said wheels, each of said linkage mechanisms including an arm rigidly carried upon the end of one of said torsion tubes opposite the equalizer arm thereon, a lever pivoted to one of said brake shoes, a link pivoted to said lever adjacent said one end thereof and pivoted at its opposite end to said other brake shoe, and a link pivotally connected to the other end of said lever connecting said arm on said torsion tube whereby when said foot operated lever is moved to apply the brakes braking force is divided between said torsion tubes by said equalizing means and all of said brake shoes are swung against their respective wheels with substantially equal force.

ARTHUR L. LEE.

REFERENCES CITED

The following references are of record in the file of this patent:

UNITED STATES PATENTS

| Number | Name | Date |
|---|---|---|
| 1,161,598 | Boardman | Nov. 23, 1915 |
| 1,509,919 | Amend | Sept. 30, 1924 |
| 1,513,219 | Cayla | Oct. 28, 1924 |
| 1,726,015 | Coseo | Aug. 27, 1929 |
| 1,776,957 | Sneed | Sept. 30, 1930 |
| 1,850,861 | Alden et al. | Mar. 22, 1932 |
| 1,926,966 | Biederman et al. | Sept. 12, 1933 |
| 2,142,622 | Watt | Jan. 3, 1939 |
| 2,323,913 | Johnson | July 13, 1943 |
| 2,401,316 | Richards | June 4, 1946 |